United States Patent
Blewitt

(10) Patent No.: US 6,732,048 B2
(45) Date of Patent: May 4, 2004

(54) ALTERNATE ROUTES GENERATION

(75) Inventor: Ronal L. Blewitt, Lone Tree, CO (US)

(73) Assignee: Maptuit Corporation, Burlington, MA (US)

( * ) Notice: Subject to any disclaimer, the term of this patent is extended or adjusted under 35 U.S.C. 154(b) by 0 days.

(21) Appl. No.: 10/114,839

(22) Filed: Apr. 2, 2002

(65) Prior Publication Data

US 2002/0143464 A1 Oct. 3, 2002

Related U.S. Application Data

(60) Provisional application No. 60/280,499, filed on Apr. 2, 2001.

(51) Int. Cl.[7] .............................................. G01C 34/00
(52) U.S. Cl. ........................................ 701/210; 701/209
(58) Field of Search ................................ 701/201, 209, 701/210; 340/995.19

(56) References Cited

U.S. PATENT DOCUMENTS

| | | | | |
|---|---|---|---|---|
| 5,220,507 A | * | 6/1993 | Kirson ........................ | 701/202 |
| 5,369,588 A | | 11/1994 | Hayami et al. | |
| 5,467,276 A | * | 11/1995 | Tsuyuki ...................... | 701/207 |
| 5,508,930 A | * | 4/1996 | Smith, Jr. .................... | 701/201 |
| 5,521,826 A | * | 5/1996 | Matsumoto ................. | 701/208 |
| 5,638,280 A | * | 6/1997 | Nishimura et al. ......... | 701/209 |
| 5,684,704 A | | 11/1997 | Okazaki | |
| 5,878,368 A | | 3/1999 | DeGraaf | |
| 6,321,161 B1 | * | 11/2001 | Herbst et al. ............... | 701/210 |

* cited by examiner

Primary Examiner—Michael J. Zanelli
(74) Attorney, Agent, or Firm—J. Mark Smith

(57) ABSTRACT

An improved method to automatically generate one or more useful alternatives to the least-cost point-to-point route on a road network. The method discourages reuse of road sections that have been previously used by inflating the costs associated with these road sections before the recalculation of the search algorithm.

6 Claims, 1 Drawing Sheet

ALTERNATE ROUTES GENERATION

The inventor, Ronald L. Blewitt, claims priority based on Provisional Patent Application Ser. No. 60/280,499, filed Apr. 2, 2001, entitled ALTERNATE ROUTES GENERATION.

AREA OF THE INVENTION

The present invention relates to generation of point-to-point routes on a transportation network. More specifically, the invention provides various methods and apparatus for automatic construction of suboptimal routes that are useful alternatives to the optimal route.

BACKGROUND OF THE INVENTION

The standard approach for generating optimal point-to-point routes is to utilize Dijkstra's algorithm [see Introduction To Algorithms, Thomas H. Cormen et al, 1990; ISBN 0-07-013143-0, Chap. 25, incorporated herein by reference] to find the route for which the overall travel cost (travel distance, travel time, etc.) is a minimum. Dijkstra's algorithm does this by systematically exploring a large number of possible routes, which can easily number in the billions. Ultimately, the algorithm constructs the least-costroute, discarding all of the other routes along the way.

Frequently, however, one wishes to construct other routes that have costs that approach the low cost of the optimal route and that also differ significantly from the optimal route and from one other. For example, a nearly optimal route that uses highways B and C rather than highways A and C can be most useful, particularly if the user has an aversion to using highway A(frequent delays, high tolls, etc.) or a preference for highway B (light traffic, few boulevard stops, etc.). In contrast, a nearly optimal route that represents only a slight departure from the optimal route (turning one block earlier or later, for instance) provides very little additional information to the user, since minor route departures generally produce minor consequences.

There are ways to construct useful alternative routes manually. One can, for instance, prohibit use of one or more key street segments on the original route, by deleting them from the street network or by setting their costs to some very large value. One can also force the route to use some other route by judiciously selecting a waypoint on that other route, then generating the alternate route in two pieces (origin to waypoint, waypoint to destination). Since both approaches yield results that depend greatly upon the skill of the operator, neither approach is amenable to automation.

Of these types of methods the patent of DeGraaf (U.S. Pat. No. 5,878,368) makes use of these methods. User selects and designates as preferred or to be avoided specific sections or areas of a map or alters the costs of certain streets.

Hayami (U.S. Pat. No. 5,369,588) makes use of the way point method of altering a route selection process. By choosing a specific way point, it creates a bias toward some specific route alternative.

Okazaki (U.S. Pat. No. 5,684,704) uses heuristic methods of route selection combined with varying ranges for suitable searches depending on the rank, speed or other attribute of the street or roadway.

All of these use the individual's input to alter or affect the route choices. Thus, the skill and experience of the operator is essential.

SUMMARY OF THE INVENTION

The present invention provides methods and apparatus for automatically generating useful alternatives to the least-cost route from some origin point A to some destination point B. Each alternate route is generated, using the same method employed to obtain initial least-cost route, after first discouraging re-use of most street segments used by the least-cost route and all previously-generated alternate routes. The mechanism for discouraging re-use is to artificially inflate the costs associated with using those previously-used street segments.

An essential feature of the present invention is that the magnitude of the cost inflation is adjusted automatically so that: (1) as a rule, each alternate route requested differs significantly from both the original route and also differs significantly from every other alternate route generated so far, but route duplication is never prohibited outright; (2) significant route-to-route duplication is tolerated, but route-to-route duplication seldom exceeds 70%(or some other threshold value preselected by the designer or user) until all viable route alternatives have been generated. To accomplish this behavior, the magnitude of the cost inflation is initialized to a relatively small value (20%, or some other threshold value preselected by the designer or user), then is automatically increased in response to the amount of route duplication encountered as alternate routes are generated. If many near-optimal alternate routes exist, very little route duplication is encountered, and the cost inflation remains near its initial value. If instead few near-optimal alternate routes exist, much route duplication occurs, and the cost inflation is quickly increased to where significantly suboptimal alternate routes are generated. In the extreme case where no near-optimal alternate routes exist, the first attempt to generate an alternate route can produce total route duplication. At that point, the cost inflation is doubled (to 40%), and the alternate route is then regenerated using that higher cost inflation. All of this is accomplished without user feedback.

In the preferred embodiment, cost inflation is uniformly applied to previously used street segments, except that it is not applied to street segments in the proximity of the route origin and route destination. Specifically, it is imposed upon the middle 90% of the street segments used by the original route (and any earlier alternate route), leaving the first 5% and the last 5% of the street segment costs unchanged. The rationale for not including street segments near the origin and destination is that street segment re-use near the origin and destination is generally inconsequential, and is often unavoidable as well.

In another embodiment, cost inflation is applied non-uniformly to previously-used street segments. For example, to discourage what might be regarded as excessive re-use of some street segments, a higher amount of cost inflation can be applied to street segments that have been used more than once by the original and earlier alternate routes.

In another embodiment, an alternate route may be regenerated two or more times when route duplication exceeding 70% (relative to the original route and earlier alternate routes) persists, so that route duplication exceeding 70% is precluded altogether.

A further understanding of the nature and advantages of the present invention may be realized by referring to the remaining portions of the specification and the drawings.

DESCRIPTION OF THE PREFERRED EMBODIMENT

Figure 1:
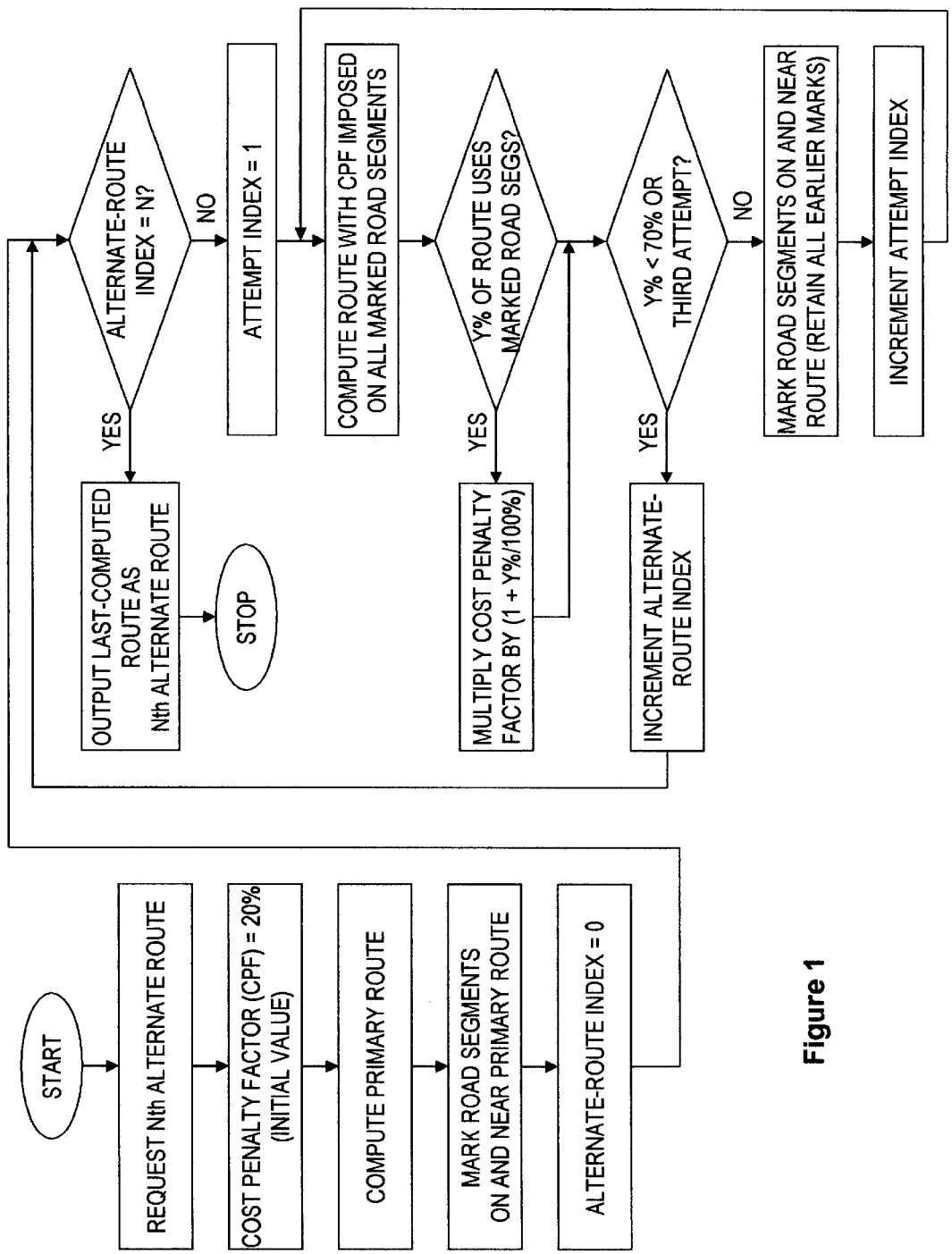
FIG. 1 is a flowchart describing the preferred embodiment of the present invention.

The present invention first generates the least-cost route from the route origin to the route destination by applying Dijkstra's algorithm, or some variant thereof, to a graph representation (i.e., vertices and edges) of the road network, where the cost for a route is computed by summing the edge costs along the route. The invention then artificially inflates edge costs along most of original least-cost route by some amount, in order to discourage re-use of these same edges when generating alternate routes. In the preferred embodiment, these edge costs are inflated by 20% for the middle 90% of the original route only, leaving the edge costs unchanged for the first 5% and the last 5% of the original route.

Per FIG. 1 and the accompanying computer pseudo-code listing, every graph edge has a cost penalty flag associated with it. Initially, every one of these flags is set to false. After the original route is generated, the cost penalty flags for the middle 90% of the edges used by that route are now set to true, and these cost penalty flags remain set to true throughout the generation of all subsequent alternate routes between that same route origin and route destination.

With a cost inflation factor of 20% applied to the selected edges, a new least-cost route is generated. If that new route virtually duplicates the original route (it will do this when all alternative routes are much more costly), the cost inflation factor is doubled. If the new route partially duplicates the previous route, the cost inflation factor is still increased, but by a proportionately smaller amount.

The particular means used to estimate the amount of duplication, described in detail in the accompanying computer pseudo-code listing, is to compare the actual cost penalty incurred by the alternate route to an estimate of the cost penalty it would have incurred had it followed a previous route. That ratio is then applied directly to the cost inflation factor.

If the new route duplicates less than 70% of the original route, the new route becomes the first alternate route. If duplication exceeds 70%, however, the new route is regenerated once using the increased cost inflation factor and the regenerated route becomes the first alternative route instead; to the extent that the regenerated route re-uses edges from the earlier two routes, the cost inflation factor is again increased.

Each time another alternative route is desired, the current value of the cost inflation factor is first applied to any edge utilized by the middle 90% of the original route or utilized by the middle 90% of any previous alternative route, and then a new route is generated. Each time a new route is generated, the cost inflation factor is increased further, with the magnitude of the increase reflecting the extent to which the new route re-uses edges employed by earlier routes. As with the first alternate route, 70% duplication of previous routes is the threshold below which the new route becomes the next alternate route and above which the new route is regenerated before being offered as the next alternate route.

The setting of cost penalty flags is not strictly confined to the edges along the previously generated route; edges on either side of these routes also have their cost penalty flags set. This method effectively discourages the generation of later routes that do not differ materially from earlier routes route, by also discouraging the use of roads immediately on either side of the original route. After cost penalty flags are set for all edges on the actual route, this method first sets cost penalty flags for all edges that lead directly to or from the earlier route, then sets cost penalty flags for all edges leading to and from those edges. In the preferred embodiment, this lateral extension process is repeated until the width of the region on either side of the earlier route with cost penalty flags set is about 5% of the length of the original route from origin to destination (2.5% on either side).

Embodiments and Applications

The ability to autonomously generate a suite of candidate routes (a primary least-cost route, plus one or more useful alternatives) facilitates customized applications that do not require a specialized set of graph edge costs for each customer. The strategy is to first generate the suite of routes from a generic set of graph edge costs, then do one or more of the following: (1) for each such route, compute travel time, travel distance, vehicle-specific highway toll fees, etc., and from these compute a customer-specific overall route cost for each route; (2) for each such route, check for vehicle weight and size restrictions; (3) for each route, check for customer-specific and application-specific preferences (e.g., avoid Highway 90 between Albany and Syracuse); (4) for each route, check for accidents, congestion, and road construction; (5) for each route, check for severe weather conditions; (6) for each route, check for temporary (time-of-day, time-of-year, etc.) turn restrictions, lane restrictions, and road closures. Because of the temporal component to items 4 through 6 above, these three items are particularly difficult to model with modified graph edge costs prior to route generation. In contrast, once a suite of candidate routes has been generated, one can use the anticipated route start time to predict the likely impact of various time-dependent costs (even toll fees can vary with day of week or time of day) on each of the candidate routes. One can even use this information to evaluate the impact of traveling at different times of the day, or to suggest a different start time (e.g., use the primary route, but leave an hour earlier to beat the rush hour traffic).

This strategy also supports a full spectrum of approaches to final route selection. At one end of the spectrum, a fully automated approach would use an application-specific and/or customer-specific formula to make the final route selection. At the other end, a totally manual approach would transmit all the details on each candidate route and leave the final route selection to the user.

Conclusion

While the invention has been particularly shown and described with reference to specific embodiments thereof, it will be understood by those skilled in the art that the foregoing and other changes in the form and details may be made therein without departing from the spirit or scope of the invention. Additionally, it will be understood that certain numeric quantities and multiplicative factors may be increased, decreased, set to zero, or assigned noninteger values, all without departing from the spirit or scope of the invention.

```
//------------------------------------------------
// Initialize all cost penalty flags (one for each edge) to
// false.
//------------------------------------------------
FOR edge = 1 TO totalEdgesCount STEP 1
    costPenaltyFlags(edge) = false;
NEXT edge
//------------------------------------------------
// Initialze cost penalty factor 20%.
//------------------------------------------------
costPenaltyFactor = 0.2;
//------------------------------------------------
// Generate primary route.
//------------------------------------------------
generateRoute(origin, destination : routeEdges, routeTravelCost);
//------------------------------------------------
// Provide for 5% lateral suppression (2.5% on either side).
//------------------------------------------------
lateralPropagationsCount = 0.25 * size(routeEdges);
//------------------------------------------------
// If Nth alternate route is requested, generate alternate
// routes 1 thru N; note that altRouteIndex=0 => primary route;
// 1 => first alternate route, etc.
//------------------------------------------------
For alternateRoute=1 to alternateRouteIndex STEP 1
    //------------------------------------------------------------
    // Mark any new edges that are to be penalized (middle 90%
    // of previous route only). Effect is cumulative; before
    // generating second alternate route, edges from the primary
    // and first alternate routes are marked.
    //------------------------------------------------------------
    newEdges.clear( );
    FOR j = 0.5*size(routeEdges) + lateralEdgesCount TO
             .95*size(routeEdges) - lateralEdgesCount STEP 1
        IF (costPenaltyFlags[routeEdges[j]] = false)
            costPenaltyFlags(routeEdges[j]] =true;
            newEdges.add(routeEdges[j]);
        ENDIF
    NEXT j
    //------------------------------------------------------------
    // Also mark a band of edges on either side of the new route.
    // Construction of this band of edges is accomplished by
    // is constructed one "layer" at a time. (Growth also occurs
    // at either end of the route, which is why fewer than 90% of
    // the route edges were marked above.)
    //------------------------------------------------------------
    FOR lateralPropagation =0 1 TO lateralPropagationsCount STEP 1
        layerEdges.clear( );
        FOR edgeIndex = 1 TO size(newEdges) STEP 1
            connectingEdges =
                findConnectingEdges(newEdges[edgeIndex]);
            FOR k = 1 TO size(connectingEdges) STEP 1
                IF (costPenaltyFlags[connectingEdges[k]] = false)
                    costPenaltyFlags[connectingEdges[k]] = true;
                    layerEdges.add(connectingEdges[k]);
                ENDIF
            NEXT k
        NEXT edgeIndex
        newEdges = layerEdges;
    NEXT lateralPropagation
    //------------------------------------------------------------
    // Generate the next alternate route.
    //------------------------------------------------------------
```

What is claimed is:

1. A route-finding method that automatically constructs an optimal route and one or more route alternatives to the optimal route from Point A to Point B, each route composed of a sequence of route components with associated costs as follows:

a) a first route is constructed using a method that identifies the route, for which the sum of the component costs is minimum, b) an initial cost inflation factor is applied to the costs associated with the components of the first route, after which an interim route is constructed by reapplying the method of step a in the presence of those inflated component costs, c) if an acceptably small fraction of the components of the interim route are re-used components of the first route, the interim route becomes the first alternate route, d) if an unacceptably large fraction of the components of the interim route are re-used components of the first route, the cost inflation factor is increased, the increase being proportional to the extent to which the interim route re-uses components of the first route; and then reapplying step a with this larger cost inflation factor to produce the first alternate route.

2. The method of claim 1 wherein a second alternate route is constructed by:

e) creating a first cost inflation factor for a second alternate route, increased over the cost inflation factor used for the first alternate route in proportion to the extent to which the first alternate route re-uses components of the first route, f) applying the first cost inflation factor of step e to the original component costs of both the first route and the first alternate route, g) constructing a second interim route by reapplying step a using the inflated component costs of step f to identify a route with a minimum sum of component costs.

h) reapplying step c and determining if the second interim route becomes a second alternate route, i) if an unacceptably large fraction of the components of the second interim route are re-used components of the first route and the first alternate route, a second cost inflation factor is increased over the first cost inflation cost factor of step e, the increase being proportional to the extent to which the second interim route re-uses components of the first route and the first alternate route, and then reapplying step f and g using the second cost inflation factor, to determine a second alternate route.

3. The method of claim 2 wherein additional alternate routes are created by applying the inflated cost factor used in calculation of the immediately preceding alternate routes route to any components that are used in any prior alternate routes.

4. The method of claim 1 wherein the cost inflation factor is selectively applied to some, rather than all, components of the previous route or routes, based on their relative remoteness from Points A and B.

5. The method of claim 1 wherein the cost increase is attenuated or amplified for some previously used components, based on relative proximity to, or relative remoteness from Points A and B.

6. The method of claim 5 wherein the cost increase is amplified for those previously used components that have been used and then re-used.

* * * * *